United States Patent [19]

Piccolo et al.

[11] 4,058,389

[45] Nov. 15, 1977

[54] PROCESS FOR THE PREPARATION OF FERTILIZERS AND SOIL MODIFIERS

[75] Inventors: Luigi Piccolo; Marcello Ghirga; Antonio Paolinelli; Gian Pietro Paganessi, all of Milan, Italy

[73] Assignee: Societa' Italiana Resine S.I.R. S.p.A., Milan, Italy

[21] Appl. No.: 785,706

[22] Filed: Apr. 7, 1977

Related U.S. Application Data

[63] Continuation of Ser. No. 642,820, Dec. 22, 1975, abandoned.

[30] Foreign Application Priority Data

Dec. 20, 1974  Italy ................................. 30825/74

[51] Int. Cl.$^2$ .................. C05D 9/00; C01C 1/244; C01G 49/02
[52] U.S. Cl. ........................................... 71/31; 71/60; 71/63; 71/64 SC; 423/548; 423/632
[58] Field of Search ............... 71/1, 25, 31, 40, 51, 71/53, 60, 61, 63, 64 A, 64 R, 64 SC; 423/548, 632

[56] References Cited

U.S. PATENT DOCUMENTS

| | | | |
|---|---|---|---|
| 1,983,320 | 12/1934 | Sperr, Jr. ..................... | 423/632 X |
| 2,335,760 | 11/1943 | Hucks .......................... | 423/632 X |
| 2,374,454 | 4/1945 | Oliver et al. ................. | 423/632 X |
| 2,741,876 | 4/1956 | Paolini .......................... | 71/63 X |
| 2,788,259 | 4/1957 | Van Wirt et al. ............. | 423/632 X |

Primary Examiner—Wilbur L. Bascomb, Jr.
Assistant Examiner—Ferris H. Lander
Attorney, Agent, or Firm—Sughrue, Rothwell, Mion, Zinn and Macpeak

[57] ABSTRACT

A soil modifying composition and a concentrated solution of ammonium sulphate with a high purity degree are obtained from by-products consisting essentially of ferrous sulphate heptahydrate, obtained in the production of titanium dioxide from ilmenites by the sulphate process, by contacting solid particles of said by-products with gaseous ammonia, lixiviating the resulting product with water, thereby to recover said concentrated solution of ammonium sulphate, the dried residual solid yielding said soil modifying composition.

12 Claims, No Drawings

PROCESS FOR THE PREPARATION OF FERTILIZERS AND SOIL MODIFIERS

This is a Continuation, Division of application Ser. No. 642,820, filed Dec. 22, 1975 now abandoned.

The present invention concerns a process for the preparation of fertilizers and soil modifiers.

More specifically, the invention concerns a process for the preparation of ammonium sulphate and of soil modifiers, from the by-products obtained in the production of titanium dioxide from ilmenites, or ilmenite slag, by the sulphate process, these waste products being essentially made up of ferrous sulphate heptahydrate.

Given that the possibility of using these waste materials is rare, in particular due to their impurity content, and given that their direct disposal gives rise to a great deal of contamination, causing considerable alterations of the natural environment on account of their reducing characteristics, their toxicity and the large quantities involved, there has been a more and more pressing need to transform them opportunely into products which do not present the drawbacks described above.

Clearly the preferable solution would be to transform said by-products into materials having advantageous uses.

Processes for transforming the said waste materials into products of practical use, have been the subject of earlier Patents by Applicants (Italian Pat. Nos. 857,062, 880,264 and 913,054.

Two co-pending Patent Applications by Applicants Ser. No. 449.576 filed on 8.3.1974 and Ser. No. 509.609 filed on 26.9.1974 relate to two different techniques, for transforming the ferrous sulphate obtained as by-product in the production of titanium dioxide from ilmenites or ilmenite slag by the sulphate process, into useful products consisting of various compositions to be used in agriculture as soil modifiers and as fertilizers.

It has now been found that it is possible to transform the waste material obtained as by-product in the production of titanium dioxide from ilmenites or ilmenite slag by the sulphate process, consisting essentially of ferrous sulphate heptahydrate, into a product which is useful as a soil modifier and to obtain at the same time a concentrated solution of ammonium sulphate, with a high degree of purity, by means of the process of the present invention.

Thus, the invention provides a process for the preparation of a composition useful as soil modifier and of a concentrated solution of ammonium sulphate with a high purity degree, starting from by-products obtained in the production of titanium dioxide from ilmenites or ilmenite slag by the sulphate process, said by-products consisting essentially of ferrous sulphate heptahydrate, characterized by:

a. contacting solid particles of said by-products with gaseous ammonia, thereby to obtain a reaction product consisting essentially of ammonium sulphate and ferrous hydroxide;

b. subjecting said reaction product to oxidation by oxygen or a gas containing molecular oxygen, thereby to convert said ferrous hydroxide into ferric hydroxide;

c. lixiviating with water the product obtained in stage (b), thereby to remove from 85 to 95 wt.% of said ammonium sulphate in the form of an aqueous solution having an ammonium sulphate content of at least 40 wt.%, and separating said solution from the residual solid; and d. drying said residual solid to a water content of less than 20% by weight.

The reaction of the by-product in its solid and subdivided state with gaseous ammonia is usually carried out at a temperature of from 20° C to the melting point of the ferrous sulphate heptahydrate (about 64° C).

In this range of temperatures the reaction is instantaneous and quantitative.

The reaction with ammonia may be carried out in a vertical reactor with the fluidized bed technique, or with the mobile bed technique. In the latter case, in order to avoid agglomerations in the bed due to the water which is liberated from the ferrous sulphate heptahydrate, it is advisable to feed the ammonia, diluted with air or another inert gas, and the ferrous sulphate heptahydrate continuously and in counter-current into a preformed bed made up of ammonium sulphate and ferric hydroxide. It is also possible to use a horizontal reactor with feeding of the ammonia in counter-current to the ferrous sulphate.

In the oxidation reaction the ferrous hydroxide, obtained together with the ammonium sulphate, in the reaction of the ferrous sulphate with ammonia, is converted into ferric hydroxide.

This oxidation reaction readily takes place through treatment with oxygen, or gases containing molecular oxygen, at low temperatures, and preferably at a temperature of from 20° C to the melting point of the ferrous sulphate heptahydrate and may be carried out at the same time as the reaction with ammonia in a single reaction stage.

When the oxidation treatment is carried out in a successive stage to that of the reaction with ammonia, the temperature may even reach 90° C, but it is nonetheless not advisable to go beyond the said limit.

It has in fact been found that exceeding the temperature limits indicated above either for the reaction of ferrous sulphate with ammonia, or for the oxidation of the ferrous hydroxide to ferric hydroxide, results in a considerable reduction of the soil modifying capacity in the final product to be used in agriculture.

The oxidation stage may be carried out with techniques analogous to those described for the reaction of ferrous sulphate with ammonia, especially when it is carried out at the same time as the latter.

In one embodiment the oxidation is carried out separately from the reaction with ammonia, by means of simple exposure to the ambient air, arranging the material in a layer of a thickness such as to allow a good contact of the air with the inside of said layer.

The lixiviation by water of the product derived from the oxidation is carried out in conditions such as to extract not more than 95%, but not less than 85%, of the ammonium sulphate. To this end the amount of water is generally such as to give rise to an aqueous solution of ammonium sulphate with a concentration of from 40 to 50 wt.%, operating at a temperature of from 60° C to 90° C.

There are some fundamental advantages in this method.

In the first place, solutions of ammonium sulphate are obtained which have a high degree of purity, and may be used for the production of fertilizers, or for other potential uses.

In the second place, concentrated solutions of ammonium sulphate are obtained, from which it is possible to evaporate the water with a relatively low energy consumption, with the resulting economic advantages.

Finally, the solid residue of the lixiviation, predominantly made up of ferric hydroxide, is very easily separable from the solution by filtration.

In the preferred embodiment of the process of the present invention the lixiviation is conducted in two stages in series, so as to obtain in the first stage an aqueous solution with concentration of ammonium sulphate greater than about 45% by weight and in the second stage an aqueous solution with ammonium sulphate concentration lower than the first, but not less than 30–32% by weight.

The oxidation product, consisting essentially of ammonium sulphate and ferric hydroxide, is conveniently lixiviated with hot water, at a temperature of from 60° to 90° C, in such an amount as to obtain a slurry consisting of an ammonium sulphate solution with concentration greater than 45% by weight and of the suspended undissolved material, which are separated by means of a conventional separation technique such as filtration.

The residual solid, made up essentially of ferric hydroxide, containing absorbed therein ammonium sulphate solution, is taken up with water at 60°–90° C in such a quantity as to give a slurry consisting of an aqueous solution of ammonium sulphate with concentration not less than 30–32% by weight and of undissolved solid residue.

Under these conditions, two ammonium sulphate solutions are obtained. These solutions are combined, yielding a solution having an ammonium sulphate concentration greater than 40% by weight, up to 50% by weight and usually of the order of 45% by weight, with an ammonium sulphate extraction of from 85 to 95%. From the said resulting solution the water is easily removed by evaporation, and the resulting solid ammonium sulphate may be used as fertilizer or for other uses.

The solid remaining after lixiviation is dried down to a water content of less than 20% by weight and preferably from 9 to 18% by weight.

The solid thus obtained, consisting mainly of ferric hydroxide and of a lesser amount of ammonium sulphate, may be used directly as a soil modifier with the additional function of fertilizer.

For the purpose of improving the soil modifying capacity this solid is advantageously subjected to a treatment with sulphuric acid so as to transform, partially or totally, the ferric hydroxide into ferric sulphate. This reaction, which is practically quantitative, is usually carried out at ambient temperature (20°–25° C).

The amount of sulphuric acid is usually regulated so as to transform into sulphate a percentage of ferric hydroxide of at least 5% in moles and preferably from 20 to 90% in moles.

The treatment with sulphuric acid may be performed simply by spraying the acid at high concentration (for example the commercial one at 98%) onto the said dried remaining product.

The compositions thus obtained may be used especially as modifiers of compact soils, particularly alkaline clayey soils, with the additional fertilizing function on account of the presence of ammonium sulphate.

In these soils, which are very widespread and are barely suitable for cultivation, the structure is such as to render the circulation of air and of water practically impossible due to the arrangement of the soil particles.

In these conditions the plant life cycle becomes difficult and in many cases impossible. Moreover, these soils are subjected to leaching and erosion influences due to atmospheric precipitations.

It is already known in the art that in order to modify the characteristics of compact soils, particularly clayey ones, in order to render them suitable for cultivation, it is possible to resort to the application of ferric salts to the said soils. These salts cause the agglomeration of the minute clayey particles in the form of granules which give the soil a porous granular structure.

This structure improves the permeability and aeration of the soil, in that the water and the air can thus readily penetrate into the free spaces between the individual granules of the soil, with great advantages for the crops.

Furthermore a porous granular structure eliminates in a practically quantitative way the hazards of leaching and of erosion.

However, the direct use in agriculture of ferric salts is economically onerous, so that use is made in the art of numerous expedients for reducing the amounts required.

The invention provides instead an economically advantageous process for producing compositions, including ferric compounds, directly applicable in agriculture, especially as soil modifiers, this process being characterised by the fact that an undesired product is transformed into a useful product.

The amounts of compositions used as soil modifiers vary especially with the degree of compactness of the soil.

Thus in soils which are not excessively compact, from 10 to 20 metric quintals per hectare are sufficient, whereas in very compact clayey soils from 80 to 120 metric quintals per hectare are generally used.

Finally the compositions according to the present invention are also characterised by antichlorosis activity.

As is known chlorosis is a plant disease caused by iron deficiency.

Though, it has not yet been ascertained whether the iron is absorbed by the plants in its bivalent or trivalent form, the general opinion is that the iron is absorbed in the form of the ferrous ion.

The compositions of the invention, applied to alkaline clayey soils, in which the plants present were affected by chlorosis, have enabled this disease to be eliminated easily.

Without wishing to bind ourselves to any theory about chlorosis, since under the pH conditions of alkaline clayey soils the only form of iron which is soluble and therefore able to be assimilated by the plants, is the bivalent form, the anti-chlorosis activity of the present compositions could be accounted for by the small amounts (between 0.1 and 2% approximately in weight) of bivalent iron present in these compositions.

It is well known in the art that the ferrous sulphate obtained in the production of titanium dioxide from ilmenites or ilmenite slag by the sulphate method may be treated so as to produce ammonium sulphate.

To this end the waste material, consisting essentially of ferrous sulphate heptahydrate, are treated in an aqueous ammoniacal solution, thus to precipitate ferrous hydroxide and recover an ammonium sulphate solution.

This treatment has never been applied industrially because of a series of serious drawbacks.

In particular, such a treatment with aqueous solutions requires great volumes of liquids and therefore very bulky equipments. The operations such as crystallization, filtration and drying are much more complex and economically onerous. Moreover, the aqueous solutions of ammonium sulphate thus obtained are very dilute. Usually, the concentration in ammonium sulphate does not exceed 25-26% by weight. As a result, a high energy consumption is required in order to obtain solid ammonium sulphate.

Furthermore the process of the present invention makes possible a recovery of from 85 to 95% of the ammonium sulphate, whereas said recovery rarely exceeds 56-57% in the prior art.

In fact in this latter case the filtration of the slurry obtained by precipitation is slow and the precipitate is voluminous and difficult to wash. Finally, the separation of the iron by precipitation is always incomplete, so that the ammonium sulphate solutions obtained are very impure and stained and therefore of little commercial value.

These problems are avoided, instead, by working in accordance with the process of the present invention, which will be illustrated by the following experimental Examples, which are not intended however to limit its scope.

EXAMPLE 1

Into a horizontal, cylindrical reactor, 50 mm in diameter and 1,000 mm in length, rotating at 60 r.p.m. and equipped in the interior with a disintegration and mixing device, rotating in the direction opposite that in which the reactor rotates, there were loaded 190 grams of ferrous sulphate (a by-product of the conversion of ilmenite into titanium dioxide) having the following composition by weight:

$FeSO_4.7H_2O = 88.6\%$, $MgSO_4.7H_2O = 6.8\%$;

$Al_2(SO_4)_3.18H_2O = 0.8\%$ $MnSO_4.5H_2O = 0.56\%$;

$CaSO_4.2H_2O = 0.26\%$, $TiOSO_4 = 0.18\%$, free $H_2SO_4 = 0.09\%$;

free $H_2O$ 2.7% in weight; other products = traces.

The particle size was essentially from 0.5 to 2 mm, with some aggregates of 3-4 mm in size.

Into the reactor containing the ferrous sulphate there was then fed gaseous ammonia at the rate of 100N l/hr for 1 hour, carrying out the reaction at a temperature of 30°-40° C.

The product obtained, consisting mainly of ammonium sulphate and ferrous hydroxide was then subjected to oxidation in the same reactor.

To this end air was fed into the reactor for 1 hour at the rate of 100N l/hr, carrying out the reaction at a temperature of 50°-60° C.

The product thus obtained was lixiviated with 90 grams of water at 80° C and the resulting slurry was vacuum filtered on a Buchner funnel at a residual pressure of 50 mmHg. The speed of filtration was of 514 liters per m² per hour and as filtrate 87 grams of a solution at 47.3% by weight of ammonium sulphate were obtained.

The filtercake was taken up with 60 grams of water at 80° C and a second filtration was then carried out, under the same conditions as in the first, yielding 82.5 grams of solution at 34.6% by weight of ammonium sulphate.

By combining the two filtrates there was obtained a solution at 41% by weight of ammonium sulphate of a high degree of purity, with an iron content of 95 ppm. 86.5% of the ammonium sulphate obtained by treatment of the starting ferrous sulphate was extracted, the rest remaining incorporated in the filtercake.

This cake was dried until a water content of 12% by weight was reached and then sprayed with 73 grams of sulphuric acid at 98%, thus converting ferric hydroxide into sulphate in the dry state.

The resulting product was made up of 74.1% of ferric sulphate, 8.0% of ammonium sulphate and 10% by weight of ferric hydroxide, the remainder consisting of water of crystallization and of small amounts of conversion products of impurities present in the initial ferrous sulphate.

As a determination of the soil-modifying activity of the product obtained, a percolation speed test was carried out, and a determination was made of the distribution of the clay/silt/sand fractions in comparison with a sample of untreated soil.

In the following, by "clay" is meant those particles with a diameter of less than 0.002 mm, by "silt" those particles contained between 0.002 and 0.02 mm, and by "sand" those particles with a diameter greater than 0.02 mm.

The soil used for testing the composition was of the alkaline clayey type, from Santaluce (Pisa), and had the following characteristics:

pH = 8

$Al_2O_3 = 11.8\%$, $SiO_2 = 39.1\%$; $Na_2O = 0.55\%$ $K_2O = 3.5\%$;

$TiO_2 = 0.8\%$; $CaO = 11.4\%$; $MgO = 3.2\%$ $Fe_2O_3 = 6.1\%$;

$CO_2 = 5.7\%$; $SO_4 = 0.01\%$

The percentages are by weight.

The composition to be tested was incorporated into the soil described in an amount of 1% and was distributed therein in a homogeneous fashion; the mixture obtained was humidified and then left to mature for 50 hours. Finally it was disintegrated and sifted in its entirety.

The product with particle size below 2 mm was loaded in a layer of 100 mm in a filter bed with a diameter of 50 mm.

The percolation test was carried out by maintaining a constant water layer of 100 mm above the surface of the soil.

The comparison test was carried out in the same way on the same soil, deprived of modifier, but arranged in the same way as the modified soil.

The modified soil allowed the percolation of 297 ml of water in two hours, whereas the unmodified comparison soil allowed the percolation of only 80 ml of water.

The test concerning the determination of the clay/silt/sand fractions was carried out in accordance with the S.I.S.S. (International Soil Science Society) method.

This method provides for the dispersion of the soil by ebullition treatment with solutions of ammonium carbonate and subsequently with a solution of sodium hydroxide.

The grain size distribution is then determined on the disintegrated soil by means of the Andreasen apparatus.

In the sample of modified soil the following distribution by weight was found: clay 6%; silt 56%; sand 38%.

In the comparison sample of unmodified soil the following distribution by weight was found: clay 40%; silt 38%; sand 22%.

EXAMPLE 2

The procedure of Example 1 was repeated with the difference that the ammonia treatment of the ferrous sulphate and the oxidation were carried out simultaneously in a vertical reactor with the fluidized bed technique, rather than in a horizontal reactor and in two successive stages.

Into a vertical reactor with a diameter of 55 mm, 950 grams of a preformed mixture of ammonium sulphate and ferric hydroxide were charged, maintaining the mass fluidized by flowing air at a rate of 500N l/hr.

The fluidized bed was subsequently fed continuously at a rate of 250 g/hr with the ferrous sulphate of Example 1, previously dried and disintegrated to a particle size predominantly between 0.1 and 1 mm.

From the moment when the feeding of the ferrous sulphate began, the fluidization air was replaced by a gaseous stream consisting of air (230N l/hr), nitrogen (230 N L/hour) and ammonia (40 N l/hr), The operation was carried out at a temperature of 40°-50° C.

The product was discharged intermittently every 30 minutes and stocked into a receptacle under an ammonia atmosphere for one hour, for the purpose of completing the reaction.

This was then followed by lixiviation, filtration, reduction to slurry, second filtration, drying of the cake and conversion to sulphate, with the same working conditions and with the same proportions as in Example 1.

There was thus obtained a solution of ammonium sulphate at 42.5% by weight, with an iron content of 85 ppm and the yield in ammonium sulphate extracted was of 88%.

The composition resulting from the treatment with $H_2SO_4$ was made up of 75.5% of ferric sulphate, 7,9% of ammonium sulphate, 9.1% by weight of ferric hydroxide, the remainder consisting of water of crystallization and of small amounts of conversion products of impurities present in the initial ferrous sulphate.

The composition had the same characteristics as in Example 1, obtaining the following results:

The clay treated with this composition in the percolation test allowed the percolation of 315 ml of water in two hours, whilst in the test using the Andreasen apparatus the following distribution by weight was ascertained: clay 7%, silt 53% and sand 40%.

EXAMPLE 3

The treatment with air and ammonia of Example 1 was repeated under the same conditions. The resulting product was then lixiviated and filtered as in Example 1, obtaining a solution of ammonium sulphate at 46% by weight and a cake which, after drying, had the following composition by weight: ferric hydroxide 76.4%, ammonium sulphate 11.7% the remainder being made up of free water and of small amounts of conversion products of impurities present in the initial ferrous sulphate.

This product was tested as described in Example 1. In the percolation test of the clay treated by this product a percolation of 123 ml of water was obtained, whilst the following distribution by weight was obtained by using the Andreasen apparatus: clay 26%, silt 48% and sand 26%.

EXAMPLE 4

Example 1 was repeated with the sole difference that the cake of ferric hydroxide was treated with 36.5 grams of sulphuric acid at 98%.

There was thus obtained a product comprising 45% of ferric sulphate, 9.6% of ammonium sulphate and 36% by weight of ferric hydroxide, the remainder consisting of water of crystallization and of small amounts of conversion products of impurities present in the ferrous sulphate.

This product was tested as described in Example 1. In the percolation test, the treated clay allowed the percolation of 214 ml of water, and by the Andreasen apparatus the following distribution by weight was found: clay 14%, silt 53% and sand 33%.

EXAMPLE 5 (comparison)

For the purposes of comparison a test was carried out according to the conventional wet treatment in aqueous solution, precipitating the ferrous sulphate dissolved in water by treatment with gaseous ammonia.

198 grams of ferrous sulphate were dissolved in 207 grams of water at a temperature of 70° C (temperature at which there is the greatest solubility of ferrous sulphate in water) and, still at this temperature, gaseous ammonia was bubbled up to pH 9 through the reaction medium. At this point air was bubbled for an hour, in order to oxidize the ferrous hydroxide and thus facilitate the filtration.

The filtration was performed as described in Example 1 and the following was filtered: 75 grams of an aqueous solution at 30.3% by weight of ammonium sulphate with a filtration speed of 162 grams per m² per hour.

Again as in Example 1 the cake was taken up with 60 grams of water at 80° C and after filtration 101.4 grams of aqueous solution at 23.1% by weight of ammonium sulphate were obtained.

By combining the two filtrates there was obtained a solution at 26.2% by weight of ammonium sulphate, with a recovery of this product equal to 57% with respect to the theoretical yield.

Further washings proved not to be convenient in that they called for excessive dilution of the solution.

Furthermore the solution contained 0.7% by weight of iron, that is a commercially unacceptable content in the ammonium sulphate obtained after evaporation of the water.

A treatment of the cake with $H_2SO_4$ would give rise to a product hardly suitable for the purposes of the invention by reason of the excessive content of ammonium sulphate.

We claim:

1. A method for the preparation of a composition useful as soil modifier and of a concentrated solution of ammonium sulphate with a high purity degree, starting from by-products obtained in the production of titanium dioxide from ilmenites or ilmenite slag by the sulphate process, said by-products consisting essentially of ferrous sulphate heptahydrate, which comprises:
    a. contacting solid particles of said by-products with gaseous ammonia, thereby to obtain a reaction product consisting essentially of ammonium sulphate and ferric hydroxide;
    b. subjecting said reaction product to oxidation by oxygen or a gas containing molecular oxygen, thereby to convert said ferrous hydroxide into ferric hydroxide;

c. lixiviating with water the product obtained in stage (b), thereby to remove from 85 to 95 wt. % of said ammonium sulphate in the form of an aqueous solution having an ammonium sulphate content of at least 40 wt. %, and separating said solution from the residual solid; and d. drying said residual solid to a water content of less than 20% by weight, said steps (a) and (b) being carried out at a temperature not higher than 90° C.

2. The method of claim 1, wherein stage (a) is carried out at a temperature of from 20° C to the melting point of said ferrous sulphate heptahydrate.

3. The method of claim 1, wherein stage (b) is carried out at a temperature of from 20° to 90° C.

4. The method of claim 1, wherein stage (b) is carried out at a temperature of from 20° C to the melting point of said ferrous sulphate heptahydrate.

5. The method of claim 1, wherein stage (a) and stage (b) are carried out simultaneously at a temperature of from 20° C to the melting point of said ferrous sulphate heptahydrate.

6. The method of claim 1, wherein stage (b) is carried out by contacting with ambient air said reaction product of stage (a) arranged in a layer of a thickness such as to allow a good contact of the air with the inside of said layer.

7. The method of claim 1, wherein the amount of water used in stage (c) is such as to obtain an aqueous solution containing from 40 to 50% by weight of ammonium sulphate, said lixiviation being carried out at a temperature of from 60° to 90° C.

8. The method of claim 1, wherein stage (c) is carried out in two steps, recovering in the first step a solution containing more than 45 wt.% of ammonium sulphate and in the second step a solution containing at least 30–32 wt.% of ammonium sulphate, and combining said recovered solutions.

9. The method of claim 1, wherein said residual solid is dried to a water content of from 9 to 18 wt.%.

10. The method of claim 1, wherein said dried residual solid is treated with sulphuric acid, thereby to convert at least 5% of the ferric hydroxide present in said residual solid into sulphate.

11. The method of claim 10, wherein from 20 to 90% of said ferric hydroxide is converted into sulphate.

12. The method of claim 1 wherein said by-products contain $MgSO_4.7H_2O$, $Al_2(SO_4)_3.18H_2O$, $MnSO_4.5H_2O$, $CaSO_4.2H_2O$ and $TiOSO_4$, and said residual solid contains conversion products of said impurities.

* * * * *